(12) United States Patent
Pedersen et al.

(10) Patent No.: US 10,732,773 B2
(45) Date of Patent: *Aug. 4, 2020

(54) IMPLEMENTING A VIRTUAL CONTROLLER OUTSIDE AN AREA OF A TOUCH SENSOR

(71) Applicant: Neodrón Limited, Dublin (IE)

(72) Inventors: Trond Pedersen, Trondheim (NO); Steinar Myren, Vikhammer (NO); Vemund Bakken, Menlo Park, CA (US); Rune Watn, Trondheim (NO)

(73) Assignee: Neodrón Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 15/921,004

(22) Filed: Mar. 14, 2018

(65) Prior Publication Data

US 2018/0203546 A1   Jul. 19, 2018

Related U.S. Application Data

(63) Continuation of application No. 14/270,189, filed on May 5, 2014, now Pat. No. 9,927,927.

(51) Int. Cl.
*G06F 3/044* (2006.01)
*G06F 3/041* (2006.01)

(52) U.S. Cl.
CPC .............. *G06F 3/044* (2013.01); *G06F 3/041* (2013.01); *G06F 3/0416* (2013.01); *G06F 2203/04108* (2013.01)

(58) Field of Classification Search
CPC ........ G06F 3/044; G06F 3/041; G06F 3/0416; G06F 3/0488; G06F 3/04883;
(Continued)

(56) References Cited

U.S. PATENT DOCUMENTS 7,663,607 B2   2/2010   Hotelling et al.
7,864,503 B2   1/2011   Chang
(Continued)

FOREIGN PATENT DOCUMENTS

WO   2012129247 A2   9/2012

OTHER PUBLICATIONS

Myers, S. A. et al., "Electronic Devices With Concave Displays," U.S. Appl. No. 61/454,936, filed Mar. 21, 2011, 23 pages.
(Continued)

*Primary Examiner* — Amare Mengistu
*Assistant Examiner* — Gloryvid Figueroa-Gibson
(74) *Attorney, Agent, or Firm* — Shami Messinger PLLC

(57) ABSTRACT

In one embodiment, a method includes receiving one or more sense signals from a touch sensor of a device, comparing a value associated with the one or more sense signals to a first threshold, and determining, based on comparing the value to the first threshold, whether an object has come within a pre-determined proximity of a first pre-determined location at a surface of the device. The method further includes comparing the value associated with the one or more sense signals to a second threshold and determining, based on comparing the value to the second threshold, whether the object has come within a pre-determined proximity of a second pre-determined location at the surface of the device.

20 Claims, 6 Drawing Sheets

(58) Field of Classification Search
CPC .... G06F 3/04886; G06F 3/045; G06F 3/0412;
G06F 2203/04101; G06F 2203/04108;
G06F 2203/04104; G06F 2203/04111;
G02F 1/13338; G02F 1/134363
USPC .................................................. 345/173–174
See application file for complete search history.

(56) References Cited

U.S. PATENT DOCUMENTS

| | | | |
|---|---|---|---|
| 7,875,814 | B2 | 1/2011 | Chen et al. |
| 7,920,129 | B2 | 4/2011 | Hotelling et al. |
| 8,031,094 | B2 | 10/2011 | Hotelling et al. |
| 8,031,174 | B2 | 10/2011 | Hamblin et al. |
| 8,040,326 | B2 | 10/2011 | Hotelling et al. |
| 8,049,732 | B2 | 11/2011 | Hotelling et al. |
| 8,179,381 | B2 | 5/2012 | Frey et al. |
| 8,217,902 | B2 | 7/2012 | Chang et al. |
| 2002/0154039 | A1* | 10/2002 | Lambert .............. H03K 17/955 341/33 |
| 2008/0309635 | A1 | 12/2008 | Matsuo |
| 2009/0237372 | A1 | 9/2009 | Kim et al. |
| 2009/0315854 | A1 | 12/2009 | Matsuo |
| 2011/0050256 | A1 | 3/2011 | Frangen |
| 2012/0068941 | A1* | 3/2012 | Arrasvuori .......... G06F 3/04883 345/173 |
| 2012/0242588 | A1 | 9/2012 | Myers et al. |
| 2012/0242592 | A1 | 9/2012 | Rothkopf et al. |
| 2012/0243151 | A1 | 9/2012 | Lynch |
| 2012/0243719 | A1 | 9/2012 | Franklin et al. |
| 2013/0076612 | A1 | 3/2013 | Myers |
| 2013/0093687 | A1 | 4/2013 | Papakipos et al. |
| 2013/0106777 | A1* | 5/2013 | Yilmaz ................... G06F 3/044 345/174 |
| 2014/0210780 | A1* | 7/2014 | Lee ........................ G06F 3/044 345/174 |

OTHER PUBLICATIONS

Lynch, S. B., "Electronic Devices With Convex Displays," U.S. Appl. No. 61/454,950, filed Mar. 21, 2011, 28 pages.
Rothkopf, F. R. et al., "Electronic Devices With Flexible Displays," U.S. Appl. No. 61/454,894, filed Mar. 21, 2011, 41 pages.
Pedersen, T. et al., Non-Final Rejection, U.S. Appl. No. 14/270,189, dated Aug. 27, 2015, 14 pages.
Pedersen, T. et al., Amendment after Non-Final Rejection, U.S. Appl. No. 14/270,189, dated Jul. 6, 2015, 10 pages.
Pedersen, T. et al., Final Rejection, U.S. Appl. No. 14/270,189, dated Feb. 12, 2016, 16 pages.
Pedersen, T. et al., Response after Final Rejection, U.S. Appl. No. 14/270,189, dated Apr. 12, 2016, 10 pages.
Pedersen, T. et al., Advisory Action, U.S. Appl. No. 14/270,189, dated Apr. 28, 2016, 3 pages.
Pedersen, T. et al., Request for Continued Examination (RCE), U.S. Appl. No. 14/270,189, dated Apr. 28, 2016, 3 pages.
Pedersen, T. et al., Non-Final Rejection, U.S. Appl. No. 14/270,189, dated Jun. 22, 2016, 14 pages.
Pedersen, T. et al., Amendment after Non-Final Rejection, U.S. Appl. No. 14/270,189, dated Sep. 22, 2016, 10 pages.
Pedersen, T. et al., Final Rejection, U.S. Appl. No. 14/270,189, dated Oct. 7, 2016, 14 pages.
Pedersen, T. et al., RCE with Amendment, U.S. Appl. No. 14/270,189, dated Jan. 9, 2017, 12 pages.
Pedersen, T. et al., Non-Final Rejection, U.S. Appl. No. 14/270,189, dated Mar. 10, 2017, 19 pages.
Pedersen, T. et al., Amendment after Non-Final Rejection, U.S. Appl. No. 14/270,189, dated Jun. 12, 2017, 14 pages.
Pedersen, T. et al., Final Rejection, U.S. Appl. No. 14/270,189, dated Jul. 3, 2017, 21 pages.
Pedersen, T. et al., RCE with Amendment, U.S. Appl. No. 14/270,189, dated Oct. 3, 2017, 15 pages.
Pedersen, T. et al., Notice of Allowance, U.S. Appl. No. 14/270,189, dated Nov. 16, 2017, 9 pages.

* cited by examiner

IMPLEMENTING A VIRTUAL CONTROLLER OUTSIDE AN AREA OF A TOUCH SENSOR

RELATED APPLICATION

This application is a continuation under 35 U.S.C. § 120 of U.S. application Ser. No. 14/270,189, filed May 5, 2014 and entitled Implementing a Virtual Controller Outside an Area of a Touch Sensor, incorporated herein by reference.

TECHNICAL FIELD

This disclosure generally relates to touch sensors.

BACKGROUND

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as (for example) resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A touch-sensor controller may process the change in capacitance to determine its position on the touch screen.

DESCRIPTION OF EXAMPLE EMBODIMENTS

Figure 1:
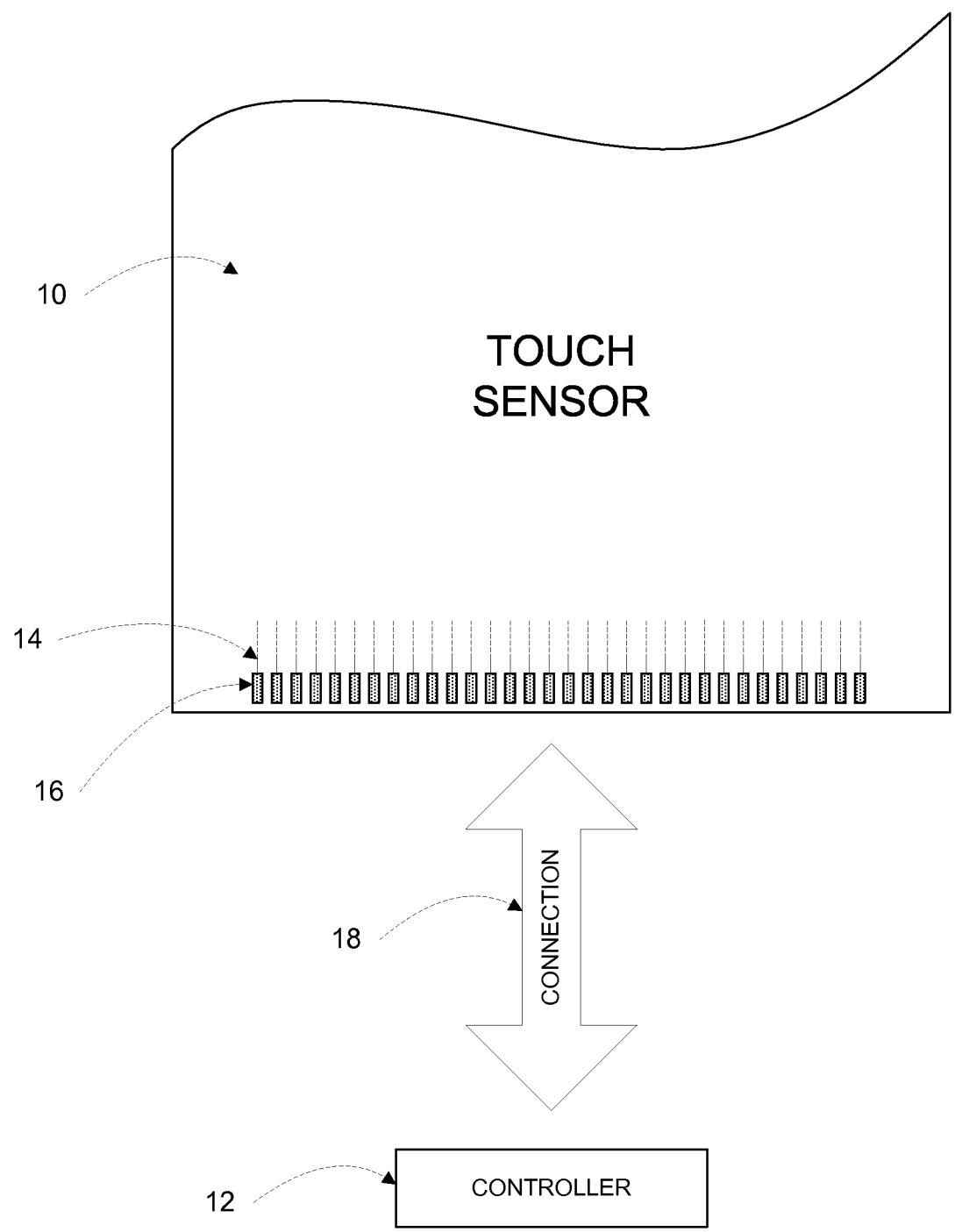
FIG. 1 illustrates an example touch sensor with an example touch-sensor controller.

FIG. 1 illustrates an example touch sensor 10 with an example touch-sensor controller 12. Touch sensor 10 and touch-sensor controller 12 may detect the presence and location of a touch or the proximity of an object within a touch-sensitive area of touch sensor 10. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 10 may include one or more touch-sensitive areas, where appropriate. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and touch-sensor controller 12. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 μm or less and a width of approximately 10 μm or less. As another example, one or more portions of the conductive material may be silver or silver-based and similarly have a thickness of approximately 5 μm or less and a width of approximately 10 μm or less. This disclosure contemplates any suitable electrodes made of any suitable material.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and touch-sensor controller 12 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 12 may determine the position of the touch or proximity within the touch-sensitive area(s) of touch sensor 10. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. Additionally, one or more ground electrodes may together form a ground line running horizontally or vertically or in any suitable orientation. In particular embodiments, drive lines may run substantially perpendicular to sense lines. In particular embodiments, drive lines may run substantially parallel to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate. Additionally, reference to a ground line may encompass one or more ground electrodes making up the ground line, and vice versa, where appropriate. In particular embodiments, any electrode may be configured as a drive, sense, or ground electrode and the configuration of any electrode may be changed during operation of touch sensor 10. In particular embodiments, configuration of electrodes may be controlled by touch-sensor controller 12.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

In particular embodiments, touch sensor 10 may determine the position of an object (such as a stylus or a user's finger or hand) that makes physical contact with a touch-sensitive area of touch sensor 10. In addition or as an alternative, in particular embodiments, touch sensor 10 may determine the position of an object that comes within proximity of touch sensor 10 without necessarily contacting touch sensor 10. In particular embodiments, an object may come within proximity of touch sensor 10 when it is located some distance above a surface of touch sensor 10; when it hovers in a particular position above a surface of touch sensor 10; when it makes a motion (such as for example a swiping motion or an air gesture) above a surface of touch sensor 10; or any suitable combination of the above. In particular embodiments, determining the position of an object that comes within proximity of touch sensor 10 without making physical contact may be referred to as determining the proximity of an object. In particular embodiments, determining the proximity of an object may comprise determining the position of an object's projection onto touch sensor 10 when the object is located some distance above a plane of touch sensor 10. The projection of an object onto touch sensor 10 may be made along an axis that is substantially orthogonal to a plane of touch sensor 10. In particular embodiments, the position of an object's projection onto touch sensor 10 may be referred to as the position or the location of an object. As an example and not by way of limitation, touch sensor 10 may determine the position of an object when the object is located above the surface of touch sensor 10 and within a distance of approximately 20 mm of the surface of touch sensor 10. Although this disclosure describes or illustrates particular touch sensors 10 that may determine a position of physical contact of an object, a proximity of an object, or a combination of the two, this disclosure contemplates any suitable touch sensor 10 suitably configured to determine a position of physical contact of an object, a proximity of an object, or any suitable combination of one or more of the above.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such one or more central processing units (CPUs)) of a device that includes touch sensor 10 and touch-sensor controller 12, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices or arrays, application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive, where appropriate. In particular embodiments, multiple touch-sensor controllers 12 are disposed on the FPC. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g. at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 μm or less. As another example, the conductive material of tracks 14 may be silver or silver-based and have a width of approximately 100 μm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between touch-sensor controller 12 and touch sensor 10.

Figure 2:
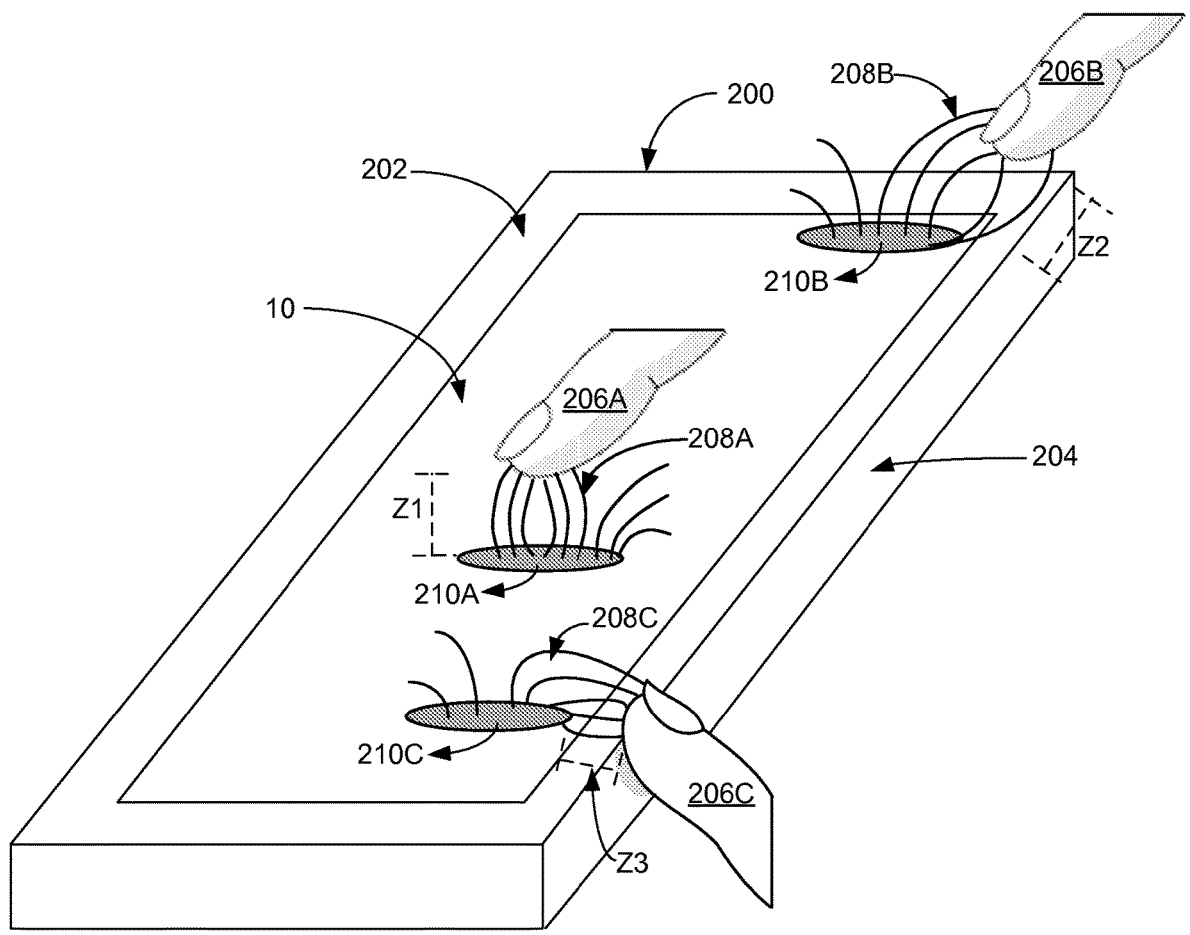
FIG. 2 illustrates example objects interacting with an example touch sensor of an example device.

FIG. 2 illustrates example objects 206A-C interacting with an example touch sensor 10 of an example device 200. Herein, reference to object 206A-C may encompass a capacitive object (for example, an object that is conductive or whose dielectric property is different from that of air), where appropriate. In the example of FIG. 2, object 206 is a user's finger. Object 206 may be an active stylus, a passive stylus, a user's palm, a user's hand, or any suitable capacitive object. Device 200 may be a tablet, a mobile phone, a smartphone, a portable media player, a display, a personal digital assistant (PDA), a satellite navigation device, a portable game console, a kiosk computer, a point-of-sale device, or any other suitable device. Device 200 may have a display (not shown). In particular embodiments, the display may be a liquid-crystal display (LCD), a light-emitting diode (LED) display, a LED-backlight LCD, or any other suitable display that may be visible through a cover panel and substrate (and the drive and sense electrodes if touch sensor 10 is disposed on it) of device 200.

In the example of FIG. 2, touch sensor 10 is a capacitive touch sensor that extends across a portion of a main surface 202 of device 200. As an example and not by way of limitation, main surface 202 may be a front face of device 200. Touch sensor 10 may be integrated with a display of the device 200. As such, touch sensor 10 (as integrated with the display of the device 200) may be known as a touch screen. Any remaining area of main surface 202 that does not encompass touch sensor 10 (and display) may belong to a bezel of the display. Although this disclosure describes particular touch sensor, this disclosure contemplates any suitable touch sensor. Although this disclosure describes particular touch sensor integrated with particular device in a particular manner, this disclosure contemplates the particular touch sensor integrated with the particular device in any suitable manner. As an example and not by way of limitation, the touch screen (that is, touch sensor 10 integrated with a display of device 200) may extend across an entire main surface 202 of device 200. As another example and not by way of limitation, touch sensor 10 (by itself and not integrated with the display of device 200) may extend across an entire front face of device 200.

In the example of FIG. 2, example objects 206A-C are within proximity of corresponding example touch-sensitive areas 210A-C of touch sensor 10. In particular embodiments associated with mutual-capacitance implementation as discussed above, each touch-sensitive area 210A-C may comprise an array of drive and sense electrodes that implements an array of capacitive nodes. Change in mutual capacitance of each capacitive node in the array may be measured by a suitable sense-measurement circuit (for example, sense-measurement circuit 300 of FIG. 3A) that is coupled to the array. The tip of each object 206A-C is located at an associated distance Z1-3 away from its corresponding touch-sensitive area 210A-C. As an example, each distance Z1-3 may be approximately between 0 and 30 millimeters. In particular embodiments, drive and sense lines within each touch-sensitive area 210A-C may sense the corresponding object 206A-C. Each drive electrode in the drive line may create a time-varying electric field that is transmitted through one or more adjacent dielectric materials, and received by one or more sense electrodes of each corresponding sense line. This electric field may be disturbed by object 206A-C. Object 206A-C may act as a virtual ground. When the electric field is disturbed by the object 206A-C acting as a virtual ground, a portion of the electric field may be shunted away by the object 206A-C. As such, mutual capacitance between the drive electrodes and sense electrodes of the corresponding touch-sensitive area 210A-C changes. This may lead to an alteration of the net charge present on the sense electrodes. As an example and not by way of limitation, object 206A-C may sink some of the charge (as transferred from the drive electrodes to the sense electrodes).

In particular embodiments, sense-measurement circuit 300 may process the charge that it receives from each capacitive node and output sense signals to the touch-sensor controller 12. Touch-sensor controller 12 may communicate information regarding the object 206A-C based at least in part on the sense signals that it receives from one or more sense-measurement circuits 300. In particular embodiments, touch-sensor controller 12 may communicate information about the position of each object 206A-C in parallel with touch sensor 10 using an appropriate coordinate system, for example a X-Y Cartesian system. As an example of U.S. Pat. No. 8,624,609 entitled Two-Dimensional Position Sensor and not by way of limitation, touch-sensor controller 12 may determine position of object 206A-C in the x-direction by an interpolation between sense signals obtained from co-extending pairs of groups of sense signals; and determine position (of object 206A-C) in the y-direction by an interpolation between sense signals obtained from different sequences of drive signals applied to the drive electrodes. In particular embodiments, movement of object 206A-C relative to touch sensor 10 may be determined by changes in each of the sense signal as object 206A-C moves. In particular embodiments, movement of object 206A-C relative to touch sensor 10 may be determined by correlating information about the position of object 206A-C with the point in time object 206A-C had been at the position. In particular embodiments when there are more than one object 206A-C within proximity of the touch sensor 10, touch-sensor controller 12 may comprise a processing sub-unit that further processes information from each object 206A-C and allows touch controller 12 to distinguish, differentiate, and track each object 206A-C. Although this disclosure describes and illustrates a mutual-capacitance implementation for a particular touch sensor, this disclosure contemplates any suitable implementation or any suitable combination of implementations for the particular touch sensor. As an example and not by way of limitation, a self-capacitance implementation (as described before) may be used for touch sensor 10 with electrodes made of ITO. As another example and not by way of limitation, a combination of self-capacitance and mutual-capacitance implementations may be used for touch sensor 10. The choice of which implementation to be used for a particular area, or an entire area of touch sensor 10, may depend at least on the complexity of hardware implementation or the desirability of single-touch versus multi-touch for the area. Furthermore, although this disclosure describes and illustrates particular components, devices, or systems for sensing one or more objects 206A-C by touch sensor 10 via mutual-capacitance, the disclosure contemplates any suitable combination of any suitable components, devices, or systems for sensing the one or more objects 206A-C by touch sensor 10 via mutual-capacitance.

In particular embodiments, capacitive object may be used in a hover configuration or mode. In hover configuration, capacitive object is in proximity but not touching touch sensor of device. One potential benefit of using hover configuration is that the touch sensor may be able to sense a capacitive object that is outside the physical limitations of the touch sensor, or even the device of the touch sensor. This is because the electric fields (between the corresponding drive electrodes and sense electrodes) extend (in one or more directions) outside the physical limitations of the touch sensor and reach at least one or more points on the capacitive object. As an example of FIG. 2 and not by way of limitation, touch sensor 10 may sense an object 206A as object 206A hovers within a distance Z1 above touch-sensitive area 210A. As another example of FIG. 2 and not by way of limitation, touch sensor 10 may sense object 206B as the object 206B hovers at an edge of main surface 202 (of the device 200) outside touch sensor 10 and within a distance Z2 from touch-sensitive area 210B. Electric fields 208B from drive electrodes of touch-sensitive area 210B project beyond the edge (closest to the object 206B) of touch sensor 10, reach object 206B, and receive by corresponding sense electrodes of touch-sensitive area 210B. As yet another example of FIG. 2 and not by way of limitation, touch sensor 10 may sense object 206C as object 206C hovers at a side surface 204 (tangential to the main surface 202) of device 200 and within a distance Z3 from touch-sensitive area 210C. Electric fields 208C from drive electrodes of touch-sensitive area 210C project beyond the edge (closest to the object 206C) of device 200, reach object 206C, and receive by corresponding sense electrodes of touch-sensitive area 210C. In particular embodiments, each distance Z1-3 may range between 0 and 30 millimeters with an approximate precision of plus or minus 2 millimeters. In particular embodiments, range of each distance Z1-3 may be the same. In particular embodiments, range of each distance Z1-3 may be different. As an example and not by way of limitation, each distance Z1-3 may be determined at least by touch-sensor controller 12, corresponding object 206A-C, location of corresponding touch-sensitive area 210A-C, drive and sense electrodes of corresponding touch-sensitive area 210A-C, and dielectrics that are present between corresponding object 206A-C and corresponding touch-sensitive area 210A-C. In particular embodiments, if distance Z3 is below a desired threshold (for example, the threshold may be determined based at least in part on the thickness of the bezel of the display), an additional sense or signal line of capacitive nodes may be added to the edge (closest to the side of device 200) of touch sensor 10 and outside of a pre-determined routing channels. By adding the sense or signal line to the edge of touch sensor 10, distance Z3 may increase. An increase in distance Z3 may help to improve the sensitivity of sense measurements at side surface 204 of device 200.

In particular embodiments, by examining the pattern of changes in measured capacitance values associated with the array of capacitive nodes in touch-sensitive area 210A-C (either for the array as a whole, or, in certain embodiments, within a subset of capacitive nodes in the array) of FIG. 2, hover distance of each object 206A-C may be determined. As an example and not by way of limitation, the hover distance may be perpendicular to and measured with respect to the plane of touch-sensitive area 210A-C. As another example and not by way of limitation, the hover distance may be measured using an X-Y-Z Cartesian coordinate with touch-sensitive area 210A-C as a reference plane for measurement. In particular embodiments, when change in the measured capacitances among the capacitive nodes is relatively large, object 206A-C may be calculated to be closer (or smaller hover distance) to touch sensor 10. In particular embodiments, when change in the measured capacitances among the capacitive nodes is relatively small, object 206A-C may be calculated to be farther (or larger hover distance) from touch sensor 10. In particular embodiments, shape of the profile of the measured capacitance values among the capacitive nodes may be used to indicate position of object 206A-C in the x-y-z direction. In particular embodiments, the hover distance may be determined by touch-sensor controller 12. In other embodiments, the hover distance may be determined by a second processor within device 200 using a response from touch-sensor controller 12. In particular embodiments, by analyzing the number of capacitance nodes in the array of touch-sensitive area 210 that experienced a measured change in capacitance, as well as the degree of change in capacitance, it may be possible to identify and track particular object 206A-C, and if so, whether the particular object is hovering within proximity of or in contact with touch sensor 10.

In particular embodiments, sense signals received from the touch sensor may be used to analyze information of each capacitive object that comes within proximity of the touch sensor. The information obtained for each capacitive object may be used to identify and suppress (or remove) any false detections. As an example and not by way of limitation, false detections may be caused by, but are not limited to, a user gripping sides of the device or a user holding the device close to the face. In particular embodiments, this information may be analyzed by the touch-sensor controller. In other embodiments, this information may be analyzed by other processors of the device based on a response from the touch-sensor controller. As examples and not by way of limitation, information of each capacitive object may include a movement, the number of times each capacitive object comes within proximity of the touch sensor, an approximate size, and an approximate shape. Although this disclosure describes using sense signals from a touch sensor in a particular manner to identify and suppress false detections, the disclosure contemplates using any suitable sense signals from the touch sensor in any suitable manner to identify and suppress any suitable false detection.

In particular embodiments, one or more pre-determined thresholds for measuring changes in capacitances may be associated with distances from touch sensor. In particular embodiments, these pre-determined thresholds may be set in the touch-sensor controller. As an example of FIG. 2 and not by way of limitation, distances Z1-3 may describe the position of object 206A-C with respect to one or more of x-, y-, and z-directions. In particular embodiments, these pre-determined thresholds may be set during calibration where changes in capacitances are measured for pre-determined object 206A-C at different pre-determined distances from touch sensor 10. Calibration may allow touch sensor 10 to access the background capacitance on each channel. The changes in background capacitances may be further processed to determine the threshold values. As another example and not by way of limitation, calibration may further include measuring capacitances for the array of capacitive nodes (the entire array of capacitive nodes in touch sensor 10, or one or more subsets of the array of capacitive nodes in touch sensor 10) in the absence of any objects 206A-C. In particular embodiments, the pre-determined thresholds (for example, set during calibration) may be used to determine whether object 206A-C is present, whether it is hovering above touch sensor 10, whether it is hovering at an edge of touch sensor 10, whether it is hovering at a side surface 204 of device 200, or whether it is touching touch sensor 10.

A capacitive object may interact or communicate with a device when it is brought in contact with or at least in proximity to a corresponding touch-sensitive area of a touch sensor of the device. Such interaction may be associated with single-touch. In particular embodiments, sense signals from the capacitive nodes of the touch-sensitive area may initiate, provide for, or terminate interactions between the capacitive object and the device (or a user of the device). As an example of FIG. 2 and not by way of limitation, interaction between object 206A-C and device 200 may occur when object 206A-C is in contact or in proximity to device 200. In particular embodiments, the user may perform a gesture or a sequence of gestures using object 206A-C, such as sliding or rotating, while object 206A-C is within proximity of touch sensor 10 of device 200. Based on the type of gesture performed, the user may initiate a pre-determined function of device 200, such as adjusting an audio volume of device 200 or scrolling through a list of items shown on the display of device 200. Although this disclosure describes single-touch interactions between particular object and particular device in a particular manner using particular components, this disclosure contemplates any single-touch interactions between any suitable object and any suitable device in any suitable manner using any suitable combination of any suitable components, devices, or systems.

In particular embodiments, one or more capacitive objects may interact or communicate with a device when each capacitive object is brought in contact with or at least in proximity to a corresponding touch-sensitive area of a touch sensor of the device. Such interaction may be associated with multi-touch. A user may perform a pinch-to-zoom gesture with at least two capacitive objects within proximity of the touch sensor. The pinch-to-zoom gesture may initiate the device to zoom-in or zoom-out of a particular content shown on a display of the device. As another example of a smartphone and not by way of limitation, a user may grip the smartphone by its surfaces using one or both hands. As such, each finger that supports the smartphone may be a distinct capacitive object. In interactions associated with multi-touch, touch-sensor controller 12 may receive information regarding each finger and palm via the touch sensor of the smartphone. In particular embodiments, touch-sensor controller 12 may determine a way the user holds the smartphone based at least in part on the information that it receives for each finger and palm. As an example and not by way of limitation, touch-sensor controller 12 may determine that the user is holding the smartphone horizontally based at least in part on a first set of information. As another example and not by way of limitation, touch-sensor controller 12 may determine that the user is holding the smartphone vertically based at least in part on a second set of information. In particular embodiments, the smartphone may change an operational mode or display content (of the smartphone) based at least in part on the way the user holds the device. In particular embodiments, the device may use multi-touch to implement one or more pre-determined virtual controllers on a side of the smartphone where the thumb is. Although this disclosure describes multi-touch interactions between particular capacitive objects and particular device in a particular manner using particular components, this disclosure contemplates any multi-touch interactions between any suitable capacitive objects and any suitable device in any suitable manner using any suitable combination of any suitable components, devices, or systems.

Figure 3A:
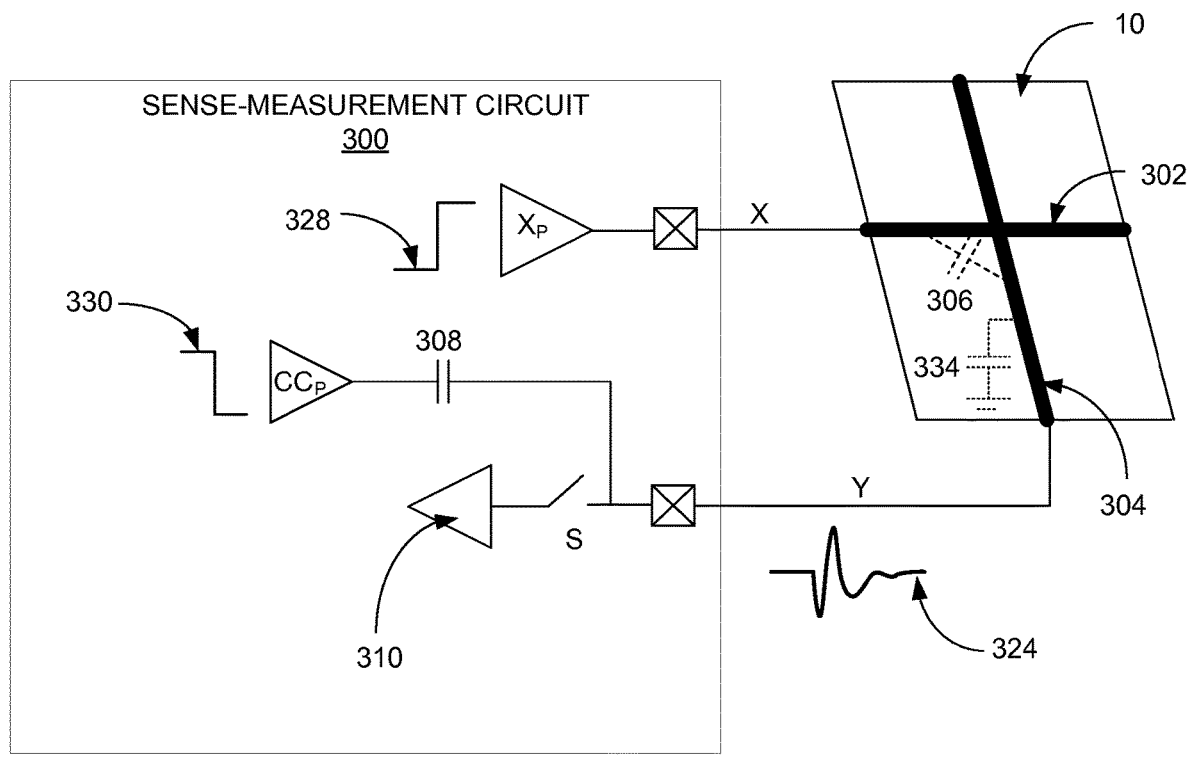
FIG. 3A illustrates an example sense-measurement circuit.

FIG. 3A illustrates an example sense-measurement circuit 300. Sense-measurement circuit 300 may be integrated with touch-sensor controller 12. As such, sense-measurement circuit 300 may comprise a drive unit and a sense unit of touch-sensor controller 12 as described above. Sense-measurement circuit 300 may also be integrated within a processor of device 200. As such, the processor may communicate with touch-sensor controller 12 of device 200 to retrieve data regarding touch sensor 10. Sense-measurement circuit 300 may implement mutual-capacitance measurement as described above. As an example of FIG. 3A and not by way of limitation, sense-measurement circuit 300 drives (via circuit $X_p$) drive signal 328 on an example interconnect X which is connected externally to one or more drive electrodes of an example drive line 302 of touch sensor 10. In particular embodiments, drive signal 328 repeatedly charges and discharges an equivalent total capacitance which is based at least in part on the sum of mutual capacitive coupling (between drive line 302 and corresponding crossing sense line 304) and any parasitic capacitances. As an example and not by way of limitation, the parasitic capacitances may comprise parasitic capacitance between interconnect Y and GND, and parasitic capacitance between sense line 304 and GND. In the example of FIG. 3A, the mutual capacitive coupling may be implemented by example capacitor 306 and the parasitic capacitances may be implemented by example capacitor 334. Drive signal 328 may possess a distinct set of electrical characteristics comprising a duty cycle, a shape profile, a frequency, one or more phases, a voltage swing, one or more voltage amplitudes, and one or more slew rates. In particular embodiments, the distinct set of electrical characteristics may be determined at least in part by touch-sensor controller 12 and an equivalent total output impedance as seen by circuit $X_p$ of sense-measurement circuit 300. In the example of FIG. 3A and further illustrated by FIG. 3B, drive signal 328 may comprise a sequence of pulses that alternate between a power voltage VDD and a ground potential GND. In particular embodiments, circuit $X_p$ may comprise one or more complementary metal-oxide semiconductor (CMOS) drivers.

Sense-measurement circuit 300 may simultaneously measure current flowing in interconnect Y as a result of drive signal 328. As an example of FIG. 3A and further illustrated by FIG. 3B, the current may manifest as sense signal 324. Sense-measurement circuit 300 may maintain a constant voltage (for example virtual GND) on interconnect Y such that current flowing through capacitor 306 between drive line 302 and sense line 304 is substantially similar to the current flowing through interconnect Y and measured by sense-measurement circuit 300. Accordingly when a capacitive object comes within proximity of drive line 302 and sense line 304 of FIG. 3A, mutual capacitive coupling (as implemented by capacitor 306 between drive line 302 and sense line 304) may change. As drive signal 328 toggles, any change in the mutual capacitive coupling may cause a change in the current flowing in interconnect Y as well as a corresponding change in sense signal 324. The amount of change in sense signal 324 as measured by sense-measurement circuit 300 may determine the proximity of any capacitive object substantially close to the drive line 302 and corresponding sense line 304. Although this disclosure describes and illustrates particular sense-measurement circuit comprising particular components for measuring proximity of particular object substantially close to particular touch sensor in a particular manner, the disclosure contemplates any suitable sense-measurement circuit comprising any suitable number of one or more suitable components for measuring proximity of any suitable object substantially close to any suitable touch sensor in any suitable manner.

Figure 3B:
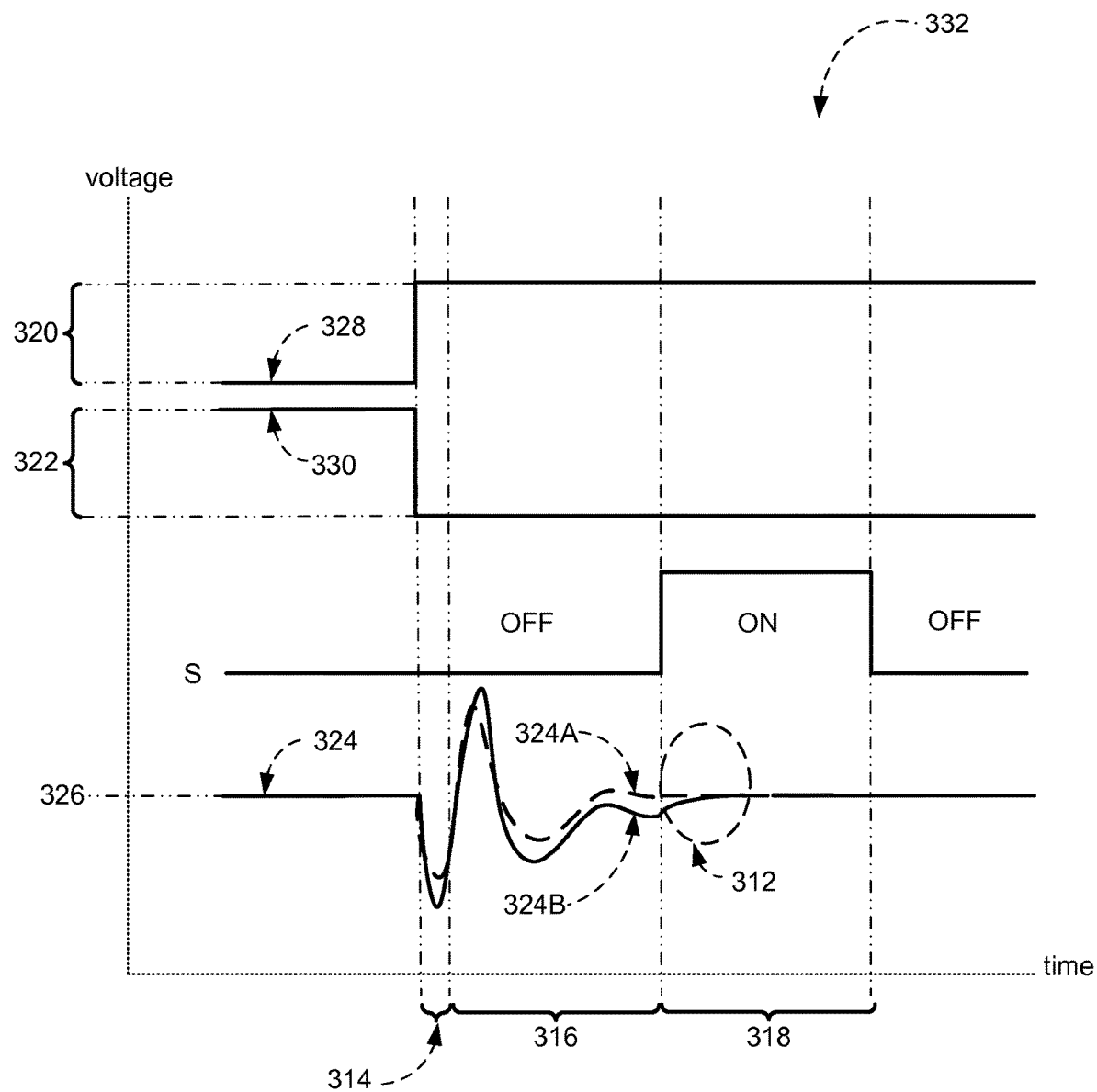
FIG. 3B illustrates example signals by sense-measurement circuit of FIG. 3A during an example proximity measurement cycle.

In the example of FIG. 3A and further illustrated by FIG. 3B, sense-measurement circuit 300 may include a charge-removal circuit that removes a constant charge from interconnect Y at the beginning of each measurement cycle 332 such that any net gain or loss in the remaining charge (or equivalently net gain or drop in voltage amplitude of remaining sense signal 324) on interconnect Y may substantially be attributed to an object within proximity of drive line 302 and corresponding sense line 304. As such, removal of the constant charge may help sense-measurement 300 to detect any capacitive change in capacitor 306 as caused by proximity of any capacitive object that may be within proximity of drive line 302 and corresponding sense line 304. In particular embodiments, the amount of constant charge to be removed may depend at least on a constant mutual capacitive coupling between drive line 302 and corresponding sense line 304. The constant mutual coupling may be substantially equivalent to the capacitance of capacitor 306 in the absence of any capacitive objects within proximity of drive line 302 and corresponding sense line 304. Accordingly the amount of the constant charge may be measured and determined during calibration of touch sensor 10 as described above. As an example of FIG. 3A, the charge-removal circuit may comprise circuit $CC_p$, internal capacitor 308, switch S, and a suitable gain stage 310. Circuit $CC_p$ may drive signal 330 (of substantially opposite phase from drive signal 328) on interconnect Y via internal capacitor 308. Furthermore the capacitance of capacitor 308 may at least be substantially equivalent to the capacitance of capacitor 306 such that the constant charge as described earlier is substantially removed at the beginning of each measurement cycle 332. Accordingly, any changes in the remaining charge on interconnect Y and sense line 304 (which manifests as suitable and corresponding change in sense signal 324) may largely be due to any object within proximity of drive line 302 and corresponding sense line 304. Sense-measurement circuit 300 may also implement switch S to measure any changes in the remaining charge during a pre-determined duration of time within each measurement cycle. As an example of FIG. 3A and further illustrated by FIG. 3B, switch S may be turned on during tail-end duration 318 of sense signal 324 such that sense-measurement 300 may measure sense signal 324 when it is fully settled. This may improve accuracy of measurement by sense-measurement 300. In particular embodiments, removal of the constant charge from interconnect Y may reduce voltage amplitude of sense signal 324 to an extent that prevents sense-measurement circuit 300 from accurately measuring the remaining sense signal 324. Accordingly, gain stage 310 may amplify remaining sense signal 324. Amplifying remaining sense signal 324 may help sense-measurement circuit 300 to increase a signal-to-noise ratio (SNR) of measured sense signal 324. As an example and not by way of limitation, increasing the SNR of measured sense signal 324 may help touch sensor 10 quantify small movements of each hovering object 206A-C within proximity of touch sensor 10. In particular embodiments, gain stage 310 may include an analog-to-digital converter (ADC) with programmable gain that converts any changes in measured sense signal 324 into digital data for touch-sensor controller 12 (or any associated component that receives response from sense-measurement circuit 300) to interpret information regarding hovering objects 206A-C that are within proximity of drive line 302 and corresponding sense line 304. Although this disclosure describes and illustrates particular charge-removal circuit for improving SNR of particular measurement signal by particular sense-measurement circuit in a particular manner, this disclosure contemplates any suitable charge-removal circuit for improving SNR of any suitable measurement signal by any suitable sense-measurement circuit in any suitable manner. Furthermore, although this disclosure describes and illustrates particular components, devices, or systems for implementing particular charge-removal circuit for particular sense-measurement circuit in a particular manner, the disclosure contemplates any suitable combination of any suitable components, devices, or systems for implementing any suitable charge-removal circuit for any suitable sense-measurement circuit in any suitable manner. As an example and not by way of limitation, sense-measurement circuit 300 may include one or more digital filtering components to suppress noise when measuring sense signal 324 or any suitable signal that represents a flow of current across capacitor 306. As another example and not by way of limitation, touch-sensor controller 12 may implement one or more algorithms to enable sense-measurement circuit 300 to detect very small changes in sense signal 324 or any suitable signal that represents a change in the mutual capacitive coupling between drive line 302 and sense line 304.

FIG. 3B (not to scale) illustrates example signals by sense-measurement circuit 300 during example proximity measurement cycle 332. In the example of FIG. 3B, sense-measurement circuit 300 (via circuit $X_p$) applies an example pulse drive signal 328 of amplitude 320 on interconnect X at the beginning of measurement cycle 332. At substantially the same time, sense-measurement circuit 300 (via circuit $CC_p$) applies an example pulse signal 330 that has an opposite phase (for example, 180° or −180° from drive signal 328. Moreover amplitude 322 of signal 330 may be substantially equivalent to amplitude 320 of drive signal 328. As a result of both pulse signals 328 and 330, current flows in interconnect Y as both capacitors 306 and 334 discharge and charge. The current may be associated with sense signals 324A-B as illustrated in FIG. 3B. Both sense signals 324A-B may occur in response to an example rising edge of drive signal 328, as illustrated by FIG. 3B. In the example of FIG. 3B, sense signal 324A occurs in the absence of any objects within proximity of drive line 302 and corresponding sense line 304 of FIG. 3A. In contrast, sense signal 324B occurs when an object may be within proximity of drive line 302 and corresponding sense line 304. During discharge window 314 of FIG. 3B which immediately succeeds rising edge of drive signal 328, falling signal 330 discharges at least both capacitors 306 and 334 resulting in a dip of sense signals 324A-B below example voltage level 326 (for example, virtual GND). The dip is quickly succeeded by an overshoot of sense signals 324A-B during charge window 316. The overshoot may occur as rising drive signal 328 charges at least capacitors 306 and 334. During tail-end window 318, sense signals 324A-B gradually settle. Furthermore, switch S is turned off during discharge window 314 and charge window 316, and turned on during tail-end window 318. As described above, this may allow sense-measurement circuit 300 to properly measure sense signals 324A-C when they are fully settled. With regards to sense signal 324A in the absence of any objects within proximity of touch sensor 10, the amount of charge removed at least from both capacitors 306 and 334 of touch sensor 10 during discharge window 314 by falling signal 330 may be substantially equivalent to the amount of charge added at least to capacitors 306 and 334 during charge window 316 by rising drive signal 328 such that sense signal 324A remains substantially unchanged at voltage level 326 before discharge window 314 and after charge window 316. Equivalently, the charge-removal circuit (as described above) may sink a pre-determined amount of current at least from both capacitors 306 and 334 of touch sensor 10 during discharge window 314 and sense-measurement circuit 300 may source a substantial equivalent amount of current (as the earlier pre-determined current) via interconnect X at least to both capacitors 306 and 334 during charge window 316. As described above, the amount of change removed (or amount of charge added) may be determined at least in part by the constant mutual capacitive coupling between drive line 302 and corresponding sense line 304 in the absence of any objects within proximity of drive line 302 and sense line 304. However when an object is brought within proximity of touch sensor 10, mutual capacitive coupling between drive line 302 and corresponding sense line 304 changes. As an example sense signal 324B of FIG. 3B, the object in proximity may change the mutual capacitive coupling resulting in a corresponding change with capacitance of capacitor 306. Changing the capacitance of capacitor 306 may change the combined alternating current (AC) impedance of interconnect Y and sense line 304 as seen by sense-measurement circuit 300. Accordingly, the amount of charge being added at least to capacitors 306 and 334 (or the amount of current sourced at least to capacitors 306 and 334 from sense-measurement circuit 300) during charge window 316 causes sense signal 324B to have a larger voltage amplitude swing than sense signal 324A due at least in part to the change in the AC impedance as described above. This increase in the voltage amplitude swing may contribute to a corresponding difference in voltage amplitude between sense signal 324B and voltage level 326 at the beginning of tail-end window 318. Furthermore, this difference in voltage amplitude between sense signal 324B and voltage level 326 may be used by sense-measurement circuit 300 to measure proximity of the object as described above. Although this disclosure describes and illustrates particular signals of particular touch sense-measurement circuit having particular electrical characteristics, this disclosure contemplates any suitable signals of any suitable touch sense-measurement circuit having any suitable electrical characteristics. Although this disclosure describes and illustrates particular components of particular touch sense-measurement circuit sourcing and sinking current from particular touch sensor in a particular manner, this disclosure contemplates any suitable components of any suitable touch sense-measurement circuit sourcing and sinking current from any suitable touch sensor in any suitable manner. Although this disclosure describes and illustrates particular order of and particular timing relationships among particular signals associated with particular charge-removal circuit of particular touch sense-measurement circuit, this disclosure contemplates any suitable order of and any suitable timing relationships among any suitable signals with any suitable charge-removal circuit of any suitable touch sense-measurement circuit.

In the example region 312 of FIG. 3B, sense-measurement circuit 300 may measure any amplitude difference between sense signal 324B and voltage level 326 (or sense signal 324A) in order to determine proximity information of any object within proximity of drive line 302 and corresponding sense line 304. In particular embodiments, charge-removal circuit may cause significant reduction in amplitude of sense signal 324. If the remaining amplitude is substantially small, sense signal 324 may be amplified by a suitable gain stage (for example gain stage 310) to improve the accuracy of the measured sense signal 324 as described above. Although this disclosure describes and illustrates particular technique for measuring particular sense signal with significantly small amplitude in a particular manner, this disclosure contemplates any suitable technique for measuring any suitable sense signal with significantly small amplitude in any suitable manner.

Figure 4:
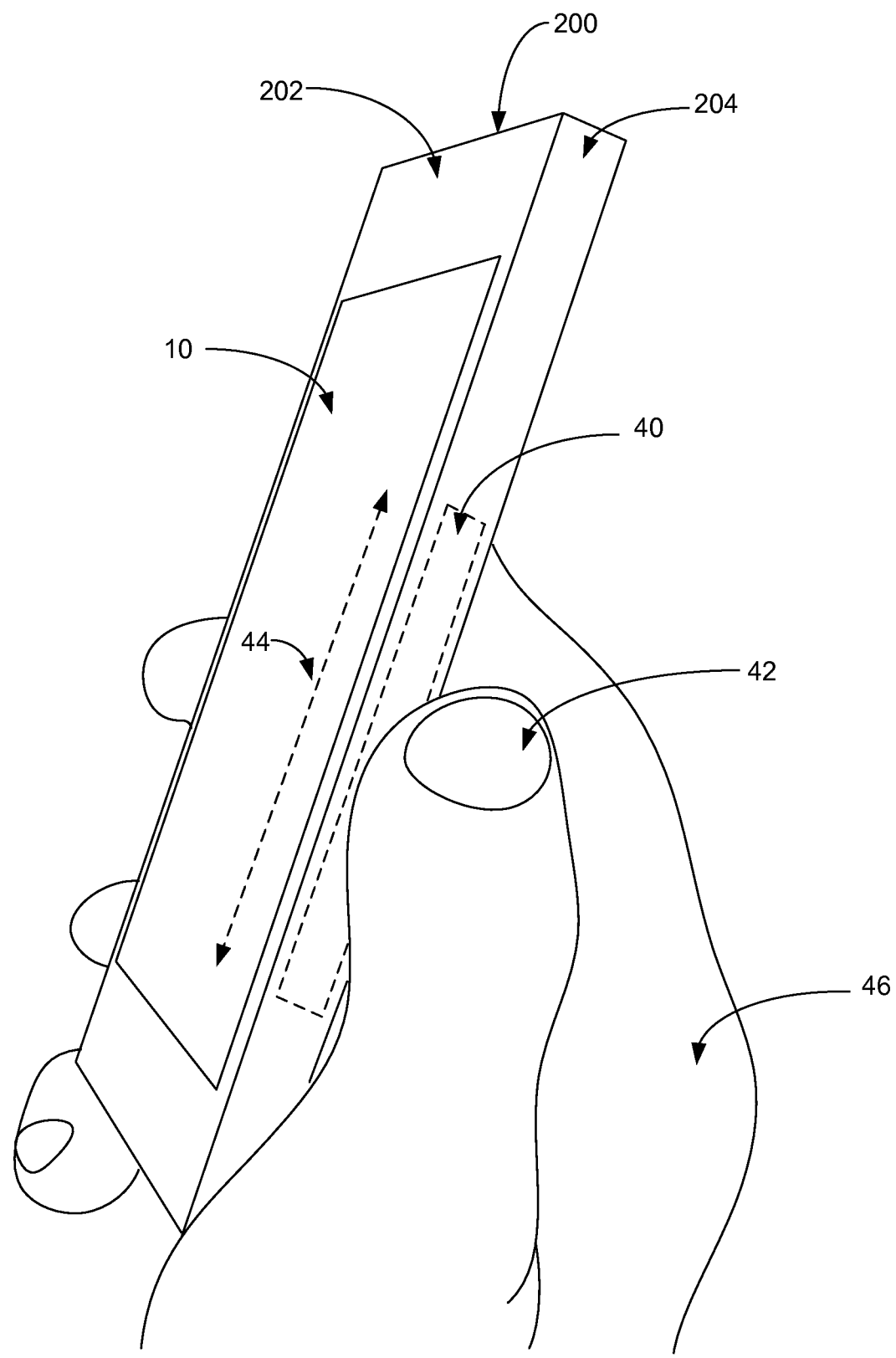
FIG. 4 illustrates an example virtual controller.

FIG. 4 illustrates an example virtual controller 40. A virtual controller of device 200 may be any non-mechanical mechanism used to operate a function of device 200. As an example of a mobile device and not by way of limitation, a mechanical controller (or mechanism) may be a button, a slider, or a wheel. The virtual controller may be the equivalent of the button, the slider, or the wheel, except that it does not possess a physical form. In the example of FIG. 4, example virtual controller 40 is a slider. Virtual controllers may be implemented on any suitable surfaces of device 200. As an example of FIG. 4, the example virtual controller 40 is implemented on a side surface 204 of device 200. As another example and not by way of limitation, a virtual controller may be implemented on a bezel (as described above) of a display of device 200. As yet another example and not by way of limitation, a virtual controller may be implemented at an edge of main surface 202 of device 200 and outside of touch sensor 10 at main surface 202.

In particular embodiments, a virtual controller may comprise one or more pre-determined locations that are located on device 200. Device 200 may be able to sense a touch, a near-proximity, and a movement of any object that comes within a pre-determined proximity of one or more of the pre-determined locations. In particular embodiments, device 200 may implement capacitive touch technologies to sense the object. As examples of FIGS. 1-4, a combination comprising touch sensor 10, one or more sense-measurement circuits 300, and one or more touch-sensor controllers 12 may be used to enable the sensing using mutual-capacitance measurements. As such, touch sensor 10 may project electric fields through any dielectric materials to encompass the pre-determined proximity of one or more of the pre-determined locations. As an example and not by way of limitation, dielectric materials may include glass, plastic, stone, ceramic, and wood. In the example of FIG. 2, one or more objects 206A-C that contact the electric fields may alter the electric fields, causing a change in the mutual capacitive coupling between drive electrodes of the drive line and sense electrodes of the corresponding sense line. Change in the mutual capacitive coupling may provide to touch-sensor controller 12 information regarding each object 206A-C as described above. Although this disclosure describes and illustrates particular capacitive touch technology that implements particular virtual controller in a particular manner using particular combination of particular components, the disclosure contemplates any suitable capacitive touch technology that implements any suitable virtual controller in any suitable manner using any suitable combination of any suitable components, devices, or systems.

In particular embodiments, a virtual controller may be a zero-dimensional sensor that represents a single point of contact. As an example and by way of limitation, the zero-dimensional sensor may be a button. In particular embodiments, the button may be a single switch that, for example, touches-on/touches-off or toggles a pre-determined function of device 200. In particular embodiments, the virtual controller may be a one-dimensional sensor that detects a linear movement of the capacitive object. Within the linear movement, the capacitive object may travel along a single axis. As an example and by way of limitation, the one-dimensional sensor may be the slider (a.k.a. example virtual controller 40) of FIG. 4. As another example and by way of limitation, the one-dimensional sensor may be a wheel.

In particular embodiments, by a user performing an action in association with the virtual controller using one or more capacitive objects, the user may initiate a pre-determined function of device 200. As an example of FIG. 4 and not by way of limitation, thumb 42 of hand 46 may perform sweep gesture 44 at example virtual controller 40. In particular embodiments, sweep gesture 44 may be a linear movement of thumb 42 along a single axis. In particular embodiments, sweep gesture 44 may be associated with a change in the position of thumb 42 from a first pre-determined location of virtual controller 40 to a second pre-determined location of virtual controller 40. As another example and not by way of limitation, two hovering capacitive objects may perform a pinch-to-zoom gesture. In particular embodiments, the pinch-to-zoom gesture may comprise a type of change in the distance between the first hovering capacitive object at the virtual controller and the second hovering capacitive object at the virtual controller. Although this disclosure describes and illustrates particular actions performed by one or more particular capacitive objects to initiate particular pre-determined function of particular device, this disclosure contemplates any suitable action, in any suitable combination of any suitable sequences, forms, or manner, by one or more of any suitable capacitive objects to initiate any suitable pre-determined function of any suitable device.

In particular embodiments, the pre-determined function may comprise changing an operation mode of device 200, changing a display content of device 200, changing a user interface of device 200, triggering a haptic feedback from device 200, or any other suitable function of device 200. As an example of FIG. 4 and not by way of limitation, virtual controller 40 (a.k.a. slider) may be an audio slider. When a user performs sweep gesture 44 at virtual controller 40 using thumb 42, an audio volume of device 200 may change. In particular embodiments, as thumb 42 moves up virtual controller 40 (a.k.a. slider), the audio volume may increase. In particular embodiments, as thumb 42 moves down virtual controller 40 (a.k.a. slider), the audio volume may decrease. As another example of FIG. 4 and not by way of limitation, virtual controller 40 (a.k.a. slider) may be a scroll-bar. When a user performs sweep gesture 44 at virtual controller 40 (a.k.a. slider) using thumb 42, a display content of device 200 may change. In particular embodiments, as thumb 42 moves up virtual controller 40 (a.k.a. slider), device 200 may scroll through a list of items in a first direction. In particular embodiments, as thumb 42 moves down virtual controller 40 (a.k.a. slider), device 200 may scroll through the list of items in a second direction.

Figure 5:
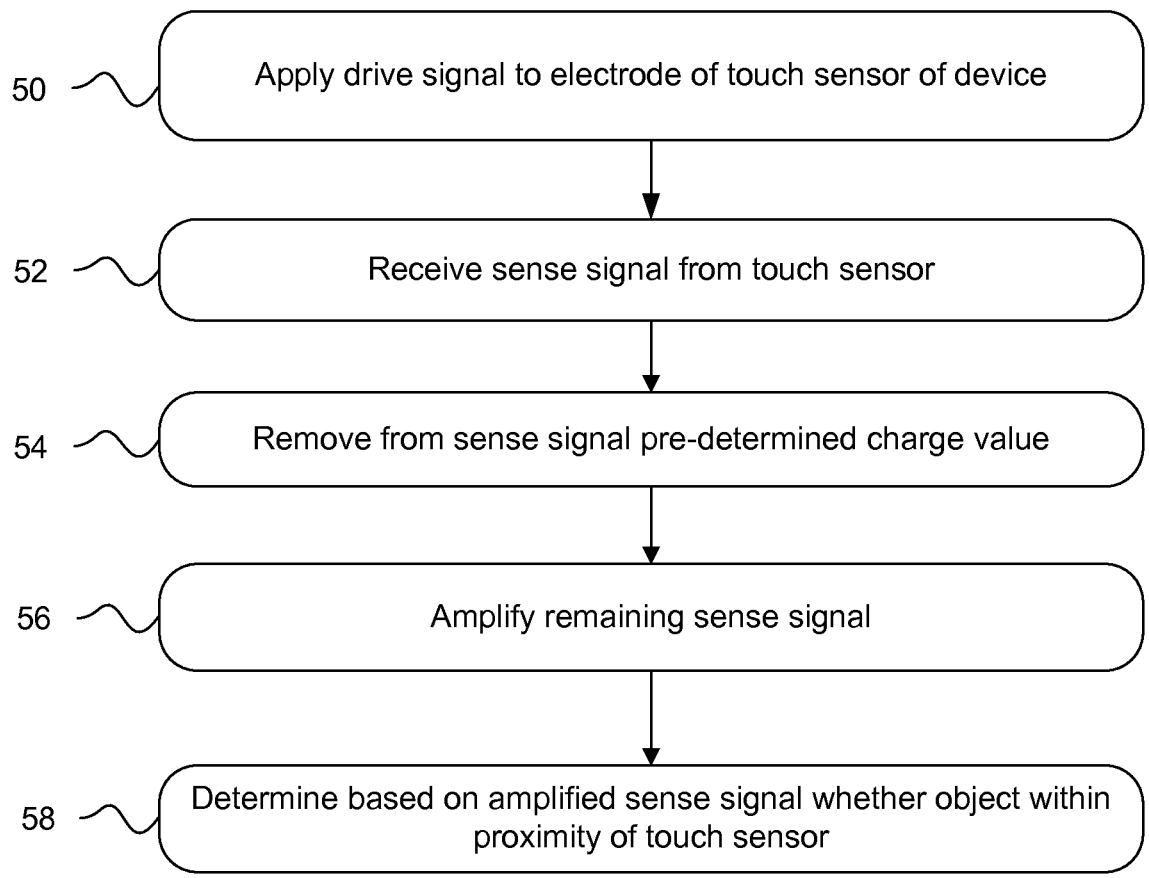
FIG. 5 illustrates an example method for implementing a virtual controller outside an area of a touch sensor.

FIG. 5 illustrates an example method for implementing a virtual controller outside an area of a touch sensor. The method may start at step 50, where drive signal may be applied to electrode of touch sensor of device. In particular embodiments, one or more drive signals may be applied to one or more electrodes of the touch sensor of the device. As an example and not by way of limitation, the device may be device 200, the touch sensor may be touch sensor 10, and the one or more drive signals may comprise sequence of drive signals 328. In particular embodiments, touch sensor 10 may extend across an area of a first surface of device 200. As an example of FIG. 2 and not by way of limitation, the first surface may be main surface 202. In particular embodiments, the electrode may be configured by the drive signal to generate electric field that projects upwards and outwards from the area of the first surface. In particular embodiments, the electric field may reach one or more pre-determined locations that are outside the area of the first surface (of the device). In particular embodiments, the one or more pre-determined locations may be associated with a virtual controller that is implemented on the device. At step 52, sense signal may be received from touch sensor. In particular embodiments, one or more sense signals may be received from the touch sensor. Accordingly, the one or more sense signals may be produced at least in part by the electric fields. In particular embodiments, the one or more sense signals may indicate whether at least one object has come within a pre-determined proximity of one or more of the pre-determined locations. As an example of FIG. 2 and not by way of limitation, the object may be any object 206A-C. At step 54, a pre-determined charge may be removed from sense signal. In particular embodiments, the pre-determined charge may be removed from each sense signal of the one or more sense signals. As an example of FIGS. 3A-B and not by way of limitation, the pre-determined charge may be determined based at least in part by the constant mutual capacitive coupling between drive line 302 and corresponding sense line 304 of touch sensor 10. At step 56, remaining sense signal may be amplified. In particular embodiments, each remaining sense signal of the one or more sense signals may be amplified. In particular embodiments, amplifying remaining sense signal comprises increasing a gain of a sense-measurement circuit of the touch sensor that receives the remaining sense signal. As an example of FIGS. 3A-B and not by way of limitation, the gain may be increased so that sense-measurement circuit 300 may detect very small changes, caused by the at least one object, in each sense signal or any suitable signal that represents a change in the mutual capacitive coupling between drive line 302 and sense line 304 of touch sensor 10. As another example of FIGS. 3A-B and not by way of limitation, gain of gain stage 310 may be increased such that sense-measurement circuit 300 may detect small changes in sense signal 324B as caused by the at least one object. At step 58, amplified sense signal may determine whether object is within proximity of touch sensor. In particular embodiments, the amplified sense signals of the one or more remaining sense signals may determine whether the at least one object is within the pre-determined proximity of the one or more of the pre-determined locations. As an example of FIGS. 3A-B and not by way of limitation, sense-measurement circuit 300, as integrated with touch-sensor controller 12, may provide information regarding proximity of the at least one object based at least in part on the one or more amplified sense signals 324A-B. In particular embodiments, the information may trigger a pre-determined function of the device via the virtual controller that is associated with the one or more pre-determined locations. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for sensing objects outside a touch sensor of a device including the particular steps of the method of FIG. 5, this disclosure contemplates any suitable method for sensing any objects outside any touch sensor of any device including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Herein, reference to a computer-readable non-transitory storage medium or media may include one or more semiconductor-based or other integrated circuits (ICs) (such as for example, a field-programmable gate array (FPGA) or an application-specific IC (ASIC)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards, SECURE DIGITAL drives, any other suitable computer-readable non-transitory storage medium or media, or any suitable combination of two or more of these, where appropriate. A computer-readable non-transitory storage medium or media may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   receiving one or more sense signals from a touch sensor of a device;
   comparing a value associated with the one or more sense signals to a first threshold;
   determining, based on comparing the value to the first threshold, whether an object has come within a pre-determined proximity of a first pre-determined location at a first surface of the device;
   comparing the value associated with the one or more sense signals to a second threshold; and
   determining, based on comparing the value to the second threshold, whether the object has come within a pre-determined proximity of a second pre-determined location at a second surface of the device, the second surface facing a different direction than the first surface;
   wherein:
      the second threshold is different from the first threshold; and
      the object coming within the pre-determined proximity of the first pre-determined location is distinguishable from the object coming within the pre-determined proximity of the second pre-determined location.

2. The method of claim 1, wherein the touch sensor of the device is a capacitive touch sensor that extends across at least a portion of the surface of the device.

3. The method of claim 1, wherein the first pre-determined location and the second pre-determined location are associated with a virtual controller implemented on the device.

4. The method of claim 1, wherein the first pre-determined location and the second pre-determined location are adjacent to the touch sensor.

5. The method of claim 1, wherein the first pre-determined location is at a touch-sensitive area of the touch sensor and the second pre-determined location is outside the touch-sensitive area of the touch sensor.

6. The method of claim 1, further comprising applying a drive signal to a drive electrode of the touch sensor of the device, wherein:
   the one or more sense signals are received from corresponding sense electrodes of the touch sensor; and
   the drive electrode and the one or more sense electrodes intersect to form one or more capacitive nodes.

7. The method of claim 1, further comprising:
   removing a pre-determined charge value from the sense signal; and
   increasing a gain of a sense-measurement circuit that receives the sense signal from the touch sensor.

8. The method of claim 1, further comprising initiating a pre-determined function of the device based at least in part on the determination that the object has come within the pre-determined proximity of the second pre-determined location, wherein the pre-determined function is one of the following:
   changing an operation mode of the device;
   changing a display content of the device;
   changing a user interface of the device; and
   triggering a haptic feedback from the device.

9. The method of claim 1, wherein the device is a smartphone.

10. A computer-readable non-transitory storage medium embodying logic that is configured when executed to:
   receive one or more sense signals from a touch sensor of a device;
   compare a value associated with the one or more sense signals to a first threshold;
   determine, based on comparing the value to the first threshold, whether an object has come within a pre-determined proximity of a first pre-determined location at a first surface of the device;
   compare the value associated with the one or more sense signals to a second threshold; and
   determine, based on comparing the value to the second threshold, whether the object has come within a pre-determined proximity of a second pre-determined location at a second surface of the device, the second surface facing a different direction than the first surface;
   wherein:
      the second threshold is different from the first threshold; and
      the object coming within the pre-determined proximity of the first pre-determined location is distinguishable from the object coming within the pre-determined proximity of the second pre-determined location.

11. The medium of claim 10, wherein the touch sensor of the device is a capacitive touch sensor that extends across at least a portion of the surface of the device.

12. The medium of claim 10, wherein the first pre-determined location and the second pre-determined location are associated with a virtual controller implemented on the device.

13. The medium of claim 10, wherein the first pre-determined location and the second pre-determined location are adjacent to the touch sensor.

14. The medium of claim 10, wherein the first pre-determined location is at a touch-sensitive area of the touch sensor and the second pre-determined location is outside the touch-sensitive area of the touch sensor.

15. The medium of claim 10, the logic further configured when executed to apply a drive signal to a drive electrode of the touch sensor of the device, wherein:
   the one or more sense signals are received from corresponding sense electrodes of the touch sensor; and
   the drive electrode and the one or more sense electrodes intersect to form one or more capacitive nodes.

16. The medium of claim 10, wherein the logic is further configured when executed to:
   remove a pre-determined charge value from the sense signal; and
   increase a gain of a sense-measurement circuit that receives the sense signal from the touch sensor.

17. The medium of claim 10, the logic further configured when executed to initiate a pre-determined function of the device based at least in part on the determination that the object has come within the pre-determined proximity of the second pre-determined location, wherein the pre-determined function is one of the following:
   changing an operation mode of the device;
   changing a display content of the device;
   changing a user interface of the device; and
   triggering a haptic feedback from the device.

18. A device comprising:
   a touch sensor; and
   a computer-readable non-transitory storage medium coupled to the touch sensor and embodying logic that is configured when executed to:
   receive one or more sense signals from the touch sensor of the device;
   compare a value associated with the one or more sense signals to a first threshold;
   determine, based on comparing the value to the first threshold, whether an object has come within a pre-determined proximity of a first predetermined location at a first surface of the device;
   compare the value associated with the one or more sense signals to a second threshold; and
   determine, based on comparing the value to the second threshold, whether the object has come within a pre-determined proximity of a second pre-determined location at a second surface of the device, the second surface facing a different direction than the first surface;
   wherein:
     the second threshold is different from the first threshold; and
     the object coming within the pre-determined proximity of the first pre-determined location is distinguishable from the object coming within the pre-determined proximity of the second pre-determined location.

19. The device of claim 18, wherein the touch sensor of the device is a capacitive touch sensor that extends across at least a portion of the surface of the device.

20. The device of claim 18, wherein the first predetermined location and the second pre-determined location are associated with a virtual controller implemented on the device.

* * * * *